April 21, 1959 J. E. WITZKY 2,882,873
STRATIFIED SPARK IGNITION INTERNAL COMBUSTION ENGINE
Filed Sept. 10, 1958
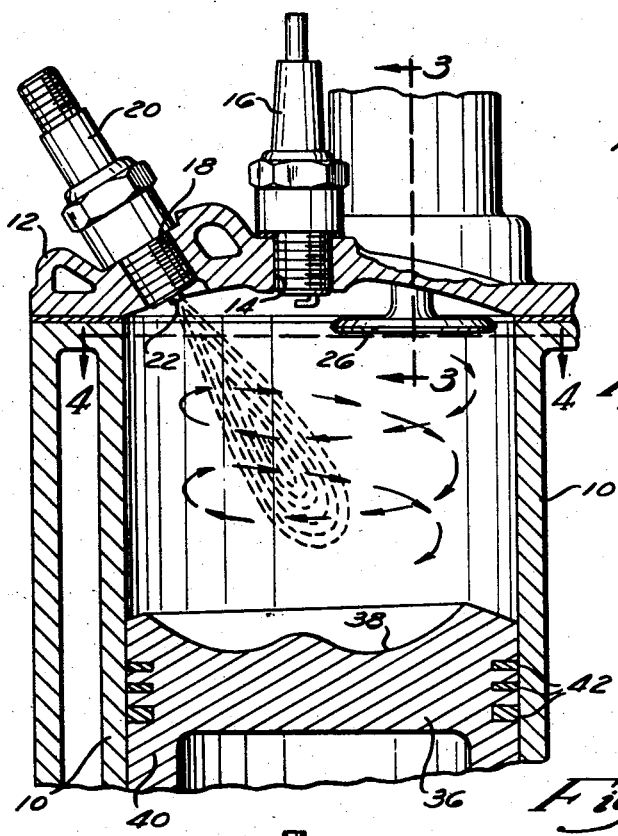
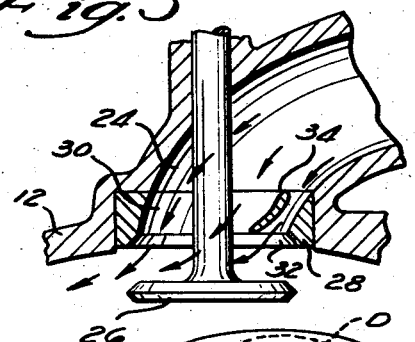
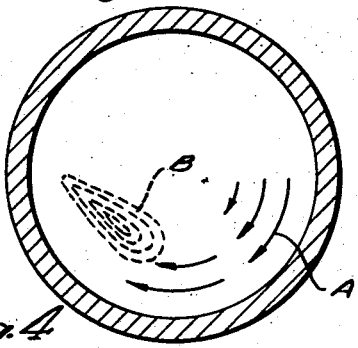
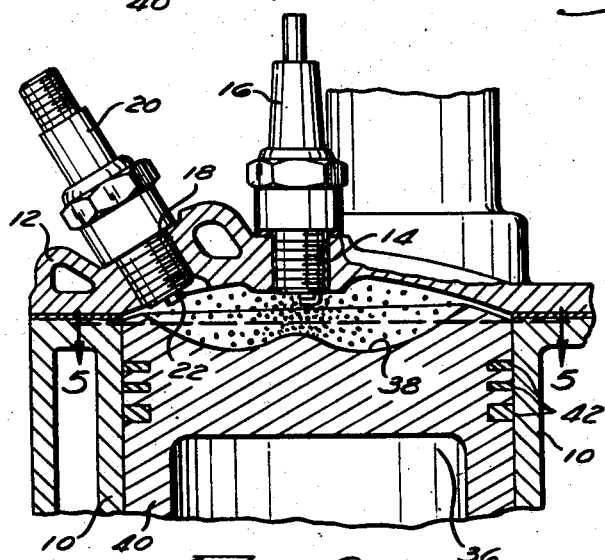
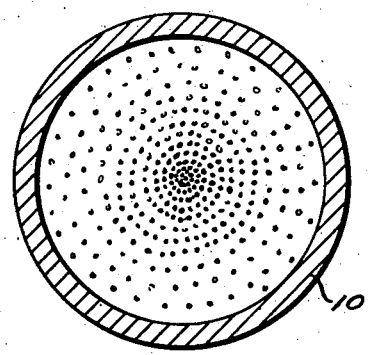
INVENTOR.
JULIUS E. WITZKY
BY A.H Edgerton
WATTS & EDGERTON
ATTORNEYS

United States Patent Office 2,882,873
Patented Apr. 21, 1959

REISSUED
MAY 19 1964
RE 25-578

2,882,873

STRATIFIED SPARK IGNITION INTERNAL COMBUSTION ENGINE

Julius E. Witzky, Cleveland Heights, Ohio

Application September 10, 1958, Serial No. 760,182

7 Claims. (Cl. 123—32)

This invention is a continuation-in-part of my former application, Serial No. 579,316, filed April 19, 1956, entitled "Stratified Gasoline Engine."

The invention relates to internal combustion engines.

Broadly, the invention comprehends the introduction of a rotating air charge into the combustion chamber of an internal combustion engine during the intake stroke of the pistons. It is well established that it is impossible to operate a gasoline engine in the lean region in the manner of a diesel engine because a homogeneous mixture cannot be ignited below eighty percent (80%) theoretical fuel. The incident invention aims to overcome this difficulty.

It has been found that if a gasoline engine could be operated without throttling the intake air, it would result in an appreciable improvement of the part load economy and increase the output due to a higher compression ratio.

A non-homogeneous charge would ideally contain one region within which all available fuel is evenly distributed. This region would have a fuel/air ratio equivalent to that which gives the best combustion and cycle efficiency. Hence, a stratified charge wherein the fuel is distributed in such a manner within the combustion chamber that the ignitable mixture is present at the spark plug and the fuel impregnated air forms a continuous region. A non-homogeneous charge becomes particularly attractive when part load operation is considered. In a gasoline engine, the air charge must be reduced with load because the mixture ratio must at least remain high, and throttling introduces various losses, and decreases the thermodynamic efficiency.

With a non-homogeneous charge, knock can be prevented by keeping lean that region of the charge which burns last and which, therefore, is prone to detonate. Since this is also the region furthest away from the spark plug, there is call for a mixture distribution which becomes progressively leaner as the distance from the spark plug increases.

Under part-load there need be no fuel at all in the region farthest from the spark plug. Under full load the overall mixture ratio can be very nearly the chemically correct one, but the local mixture ratio would vary from richer than chemically correct at the spark plug to lean at the end of the combustion chamber. From the above, it is clear that a non-homogeneous mixture is highly desirable not only from the fuel economy standpoint, but also because it achieves an output increase due to compression ratio.

An object of the invention is to provide means for introducing a stratified charge of fuel into a combustion chamber of an internal combustion engine.

Another object of the invention is to provide means for introducing a charge into the combustion chamber at part load in such a manner that an ignitable mixture is present at the spark plug.

Yet another object of the invention is to provide means for introducing a non-homogeneous charge of fuel impregnated air into the combustion chamber of an engine in such a manner that an ignitable mixture is present at the spark plug and that the mixture becomes progressively leaner as the distance from the spark plug increases.

A further object of the invention is the provision of a structure for the introduction of fuel and air into the combustion chamber of an engine wherein both the fuel and the air are rotated in the chamber so as to present an ignitable mixture at the spark plug and a progressively leaner mixture as the distance from the spark plug increases.

Other objects and advantages of the invention will appear from the following description when taken in connection with the accompanying drawings forming a part of this specification and in which:

Fig. 1 is a vertical sectional view of a cylinder for an internal combustion engine, partly broken away, the piston being positioned at the beginning of its compression stroke;

Fig. 2 is a similar sectional view illustrating the position of the piston at the end of its compression stroke;

Fig. 3 is a vertical section taken on a plane indicated by the line 3—3 in Fig. 1, illustrating the direction of flow of air entering the cylinder;

Fig. 4 is a transverse sectional view illustrating the direction of flow of air entering the combustion chamber, the section being taken on a plane indicated by the line 4—4 in Fig. 1;

Fig. 5 is a transverse sectional view illustrating, schematically, the admixture of air and fuel at the end of the compression stroke, the section being taken on a plane indicated by the line 5—5 in Fig. 2; and Fig. 6 is a schematic view illustrating the double vortex movement of the aerated fuel in the cylinder.

Referring to the drawings for more specific details of the invention, 10 indicates a cylinder of an internal combustion engine having a conventional water jacket, a head 12 for the cylinder having a threaded bore 14 substantially axially disposed in the head for the reception of a spark plug 16 and a threaded bore 18 adjacent the circumference of the head for the reception of a fuel injector nozzle 20 having a radially disposed orifice 22.

The head has an air intake channel 24 controlled by a valve 26. As shown, an insert 28 having a press fit in the head of the cylinder has an opening 30 registering with the channel 24 and the wall defining the opening is beveled to provide a seat 32 for the valve 26. The insert 28 is characterized in that a streamline vane 34 is arranged in the opening transversely thereof to direct the flow of air into a vortex during the intake stroke. A piston 36 reciprocal in the cylinder has a dome shaped head 38 and a skirt 40 carrying conventional spaced piston rings 42. However, any other shape of the piston head may be employed.

During the intake stroke of the engine, the incoming air is deflected due to the contour of the opening 30 in the insert or disk 28 and the vane 34 in the opening against the wall of the combustion chamber and is given a rotary motion, such as indicated at A in Fig. 4, and the fuel injected during the compression stroke is directed by the nozzle 22 of the fuel injector 20 against the direction of the air rotation as indicated at B also in Fig. 4, although the fuel may be injected in the direction of the air rotation during the compression stroke. Thus, the atomized fuel and the combustion air are moving around the axis of the combustion chamber. Under this condition, a well defined secondary movement occurs. This secondary movement is rather complex in nature. It is caused by friction of the air on the wall of the chamber. The rotation of air produces a centrifugal pressure against the sides of the combustion chamber; this pressure is a function of the rotational speed, and since the layers of the air toward the ends of the chamber are subjected to greater friction, they will revolve at a speed lower than the layers of air between. Since the centrifugal pressure against the wall of the chamber is higher at the middle of the chamber than at the ends thereof there will be a flow from the middle to the two ends and axially inward as indicated at C and D in Fig. 6, toward the middle from both ends. This movement, in combination with the rotary movement, produces a double helical movement in the chamber and up the center of the chamber in a spiral movement. This spiral double vortex movement carries the atomized fuel to the center of the combustion chamber and thus enriches the fuel air mixture in the region of the spark plug and the mixture becomes progressively leaner as the distance from the spark plug increases.

At part load and, consequently, reduced speed, all the fuel will be concentrated in the region of the spark plug. At full load and high rotation air velocity, the fuel air mixture will be richer than chemically correct in the axis of the combustion chamber where the spark plug is located and becomes progressively leaner as the distance from the spark plug increases.

From the foregoing, it is clear that the crux of the invention is to supply a double vortex movement of air and atomized fuel to create a rich air fuel mixture in the center of the combustion chamber where the spark plug is located. The fuel mixture becomes leaner toward the periphery of the combustion chamber. At part load operation of an internal combustion engine, it is therefore unnecessary to throttle the combustion air. Furthermore, with this arrangement, it is possible to burn hydrocarbon fuel of different volatility, such as gasoline, diesel fuel, jet fuel, and so on.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An internal combustion engine comprising a cylinder, a reciprocating piston therein, a cylinder head on said cylinder, the opposed surfaces of said piston and cylinder head forming a combustion chamber, a liquid fuel injector nozzle in said head and positioned to discharge fuel into the combustion chamber at an angle to the head of the piston when the piston is in the beginning of its compression stroke, a spark plug in said head and positioned in the vertical axis of said cylinder, an air intake valve opening in one side of said combustion chamber, means to cause the air passing through said valve to swirl in said cylinder and create a vortex of fuel and air in which the combustible rich fuel air mixture is in the center of the cylinder and the lean fuel air mixture is along the circumferential wall of the cylinder, and means connected with said spark plug for creating a spark and igniting the combustible mixture in the center of said vortex as the piston approaches its top dead center position.

2. An internal combustion engine comprising a cylinder, a reciprocative piston therein, a cylinder head on said cylinder, an air intake valve in one side of said combustion chamber, means in said cylinder head to effect a swirling movement of the air in said cylinder, a liquid fuel injector nozzle in one side of said cylinder head, means connected with said fuel nozzle for injecting a liquid fuel charge into said cylinder when said piston is disposed at the beginning of its compression stroke, the swirling movement of the air and fuel in said cylinder creating a vortex with a combustible rich fuel mixture in the center thereof, and a lean fuel mixture around the circumferential wall of said cylinder, a spark plug in said cylinder head and in the vertical axis of said cylinder, and means connected with said spark plug for igniting the combustible fuel in said vortex.

3. An internal combustion engine comprising a cylinder, a reciprocative piston therein, a cylinder head on said cylinder, said piston and cylinder head having opposed concave recesses therein constituting a combustion chamber, an unthrottled air intake valve in one side of said combustion chamber, means in said cylinder head to effect a swirling movement of the air in said cylinder, a liquid fuel injector nozzle in one side of said combustion chamber, means connected with said fuel nozzle for injecting a liquid fuel charge into said cylinder when said piston is disposed at the beginning of its compression stroke, the swirling movement of the air and fuel in said cylinder creating a vortex with a combustible rich fuel air mixture in the center thereof and a lean fuel air mixture around the circumferential wall of said cylinder, a spark plug in said head and in the vertical axis of said cylinder, and means connected with said spark plug for igniting the combustible fuel in said vortex.

4. An internal combustion engine comprising a cylinder, a reciprocative piston therein, a cylinder head on said cylinder, said piston and cylinder head having concave recesses therein with opposed central domes therein constituting a combustion chamber, an unthrottled air intake valve in one side of said combustion chamber, means in said cylinder head to effect a swirling movement of the air in said cylinder, a liquid fuel injector nozzle in one side of said combustion chamber, means connected with said fuel nozzle for injecting a liquid fuel charge into said cylinder when said piston begins its compression stroke, the swirling movement of the air and fuel in said cylinder creating a vortex with a combustible rich fuel air mixture in the center thereof, and a lean fuel air mixture around the circumferential wall of said cylinder, a spark plug in said cylinder head and in the vertical axis of said cylinder, and means connected with said spark plug for igniting the combustible fuel in said vortex when the piston reaches its top dead center position.

5. An internal combustion engine comprising a cylinder, a reciprocative piston therein, a cylinder head on said cylinder, said piston and cylinder head having opposed concave recesses therein constituting a combustion chamber, an air intake valve in one side of said combustion chamber, means in said cylinder head to effect a swirling movement of the air in said cylinder, a liquid fuel injector nozzle in one side of said head positioned to direct the fuel at a downwardly inclined angle in said combustion chamber, said fuel nozzle injecting a liquid fuel charge into said cylinder when said piston begins its compression stroke, the swirling movement of the air and fuel in said cylinder creating a vortex with a combustible rich fuel air mixture in the center thereof and a lean fuel air mixture around the circumferential wall of said cylinder, said spark plug being disposed in the medial axis of said cylinder and creating a spark and igniting the combustible fuel in said vortex when the piston reaches its top dead center position.

6. In an unthrottled internal combustion engine, a cylinder, a head therefore, and a piston movable in the cylinder, an ignition means arranged centrally of the head, an air inlet passage in the head adjacent the wall of the cylinder, an insert in the discharge end of the air inlet passage having an opening therethrough, a vane in the opening for deflecting the air, a valve for control of the opening, and a fuel inlet in the head having a radially disposed orifice for the discharge of fuel in the direction of movement of the air at the beginning of the compression stroke of the piston.

7. In an unthrottled internal combustion engine, a cylinder, a head therefore, and a piston movable in the cylinder, an ignition means arranged centrally of the head, an air inlet passage in the head adjacent the wall of the cylinder, an insert in the discharge end of the air inlet passage having an opening therethrough, a vane in the opening for deflecting the air, a valve for control of the opening, and a fuel inlet in the head having a radially disposed orifice for the discharge of fuel against the path of movement of the air at the beginning of the compression stroke of the piston.

No references cited.